United States Patent [19]

Creed

[11] Patent Number: 5,417,997
[45] Date of Patent: May 23, 1995

[54] PROCESS OF MAKING REINFORCED POROUS PIPE

[76] Inventor: Donald J. Creed, 428 Pennsylvania Ave., Plymouth, Ind. 46563

[21] Appl. No.: 96,411

[22] Filed: Jul. 26, 1993

[51] Int. Cl.⁶ .................. B29C 47/00; B29C 67/20
[52] U.S. Cl. .................. 264/563; 156/149; 156/172; 156/244.14; 264/103; 264/140; 264/173; 264/178 R; 264/209.1; 264/211
[58] Field of Search ............ 264/41, 45.9, 103, 140, 264/173, 178 R, 209.1, 211, 515, 563; 156/77, 149, 172, 244.13, 244.14

[56] References Cited

U.S. PATENT DOCUMENTS

| | | | |
|---|---|---|---|
| 3,945,873 | 3/1976 | Osborn | 156/244.27 X |
| 4,182,582 | 1/1980 | Youval et al. | 264/45.9 X |
| 4,616,055 | 10/1986 | Mason | 264/41 X |
| 4,958,770 | 9/1990 | Mitchell | 264/41 X |

FOREIGN PATENT DOCUMENTS 60-53295  3/1985  Japan ................. 264/173

*Primary Examiner*—Leo B. Tentoni
*Attorney, Agent, or Firm*—Rodger H. Flagg

[57] ABSTRACT

A method and apparatus for continuously manufacturing a reinforced, flexible, porous, tubular pipe. The reinforced, flexible porous tubular pipe comprises an extruded porous inner layer, spiral wound open mesh webbing surrounding the porous inner layer, and an extruded porous outer layer. A granular elastomeric material is blended with a polyethylene polymer thermoplastic and an emulsifier, heated and passed through a first extruding means to form a flexible, tubular porous inner layer. The porous inner layer is passed through a quick cooling means, then an open mesh webbing is spirally wound about the porous inner layer. The porous inner layer and the open mesh webbing are then passed through a second extruding means to form a porous outer layer. The reinforced, flexible porous tubular pipe is then cut to length and coiled to suit manufacturing preference.

24 Claims, 1 Drawing Sheet

PROCESS OF MAKING REINFORCED POROUS PIPE

BACKGROUND OF THE INVENTION

1. Field of the Invention

This invention relates to the manufacture of flexible, porous hose or pipe principally used in watering systems. More particularly, this invention relates to the manufacture of tubular, reinforced porous hose or pipe intended for use in surface and subsurface, pressurized, continuous feed moisture watering systems, commonly known as trickle irrigation, or drip irrigation systems. For purposes of this invention, the term porous pipe is intended to include both tubular porous pipe and tubular porous hose used for either sub-surface or above ground irrigation.

2. Description of the Prior Art

U.S. Pat. No. 2,130,498 issued to Klemschofski et al. discloses one porous pipe structure. Other known porous pipe patents include U.S. Pat. Nos. 2,807,505 issued to Weitzel; 4,003,408 issued to Turner; 4,028,288 issued to Turner; 4,110,420 issued to Turner; 4,168,799 issued to Turner; 4,191,522 issued to Turner; 4,235,561 issued to Peterson; 4,517,316 issued to Mason; 4,615,642 issued to Mason; 4,616,055 issued to Mason; 4,740,104 issued to Stohr et. al.; 4,931,236 issued to Hettinga; and 4,958,770 issued to Mitchell.

U.S. Pat. No. 4,028,288 issued to Turner, is representative of moldable products using granular material made from reclaimed tires.

U.S. Pat. No. 4,930,934 issued to Adkins is representative of the use of porous pipe structures in a continuous feed moisture maintenance system for irrigation of plants, shrubs, and trees.

U.S. Pat. No. 3,586,558 issued to Galloway et. al. discloses the manufacture of reinforced non-porous tubular hose.

The porous pipe disclosed in the prior art is typically a low pressure porous pipe, which does not have the strength to be pulled through the soil with inexpensive vibra-plow technology.

Vibra-plow technology has developed as a low-cost way of installing electrical conduit and wires, flexible non-porous water pipe, etc. Vibra-plow technology eliminates the need for pre-digging a hole, placing the pipe or conduit into the hole, then covering the hole with the material previously removed. Vibra-plow technology pulls the pipe from its starting point, into the ground, and installs the pipe beneath the ground with a blade extending from the vehicle. The blade cuts through the top surface of the soil to install the pipe beneath the soil in one inexpensive operation. No separate hole digging or back filling is required. The impact on the environment is negligible.

Porous pipe, as currently manufactured, breaks when pulled with a force sufficient to use the Vibra-plow technology. Therefore, what is needed is an improved, reinforced porous pipe which has the strength to be pulled beneath the ground without breaking, as practiced in conventional Vibra-plow technology.

SUMMARY OF THE INVENTION

Applicants invention discloses a method for continuously manufacturing a flexible reinforced porous pipe, and the flexible reinforced porous pipe apparatus made thereby.

The reinforced porous pipe disclosed herein, comprises several important advantages not disclosed in the known prior art. The reinforced porous pipe of the present invention is strong enough to be installed by vibra-plow technology. The porous pipe disclosed herein is capable of withstanding higher internal pressures, without damage to the porous pipe, and the higher internal pressures provide improved clogging resistance, and more uniform fluid dispersion characteristics over longer pipe runs. Higher internal pressures also enable the user to feed water-soluble chemicals and fertilizers through the walls of the porous pipe, without the pore clogging problems associated with low pressure porous pipe.

The reinforced porous pipe disclosed herein is preferably manufactured by blending a granular elastomeric material with polyethylene polymer thermoplastic material and an emulsifier to form a plasticizable feed stock; heating and passing the feed stock through a first extruding means to form a porous inner layer, quick cooling the porous inner layer by pulling the porous inner layer through a liquid tray, spiral winding a webbing about the porous inner layer, and passing the porous inner layer and the webbing through a second extruding means, to form a porous outer layer thereon to form the reinforced porous pipe disclosed herein.

The porosity of the inner and outer layers of the porous pipe is improved by forcing a pressurized fluid into the core of the feed stock as it passes through the first extrusion means. The pressurized fluid exits through the plurality of pores disbursed throughout the walls of the porous inner layer.

The reinforced porous pipe disclosed herein may be used above ground as well as below ground, and preferably includes ultra-violet inhibitors, to resist degradation due to prolonged sun exposure. Also disclosed, is the use of a coloring agent selected to reflect sunlight, rather than absorb sunlight, to lower the internal temperature of the pressurized fluid within the porous pipe, when used in above ground applications.

BRIEF DESCRIPTION OF THE DRAWINGS

The above mentioned and other features and objects of this invention will become more apparent and the invention itself will be best understood by reference to the following description of the invention taken in conjunction with the accompanying drawings, wherein.

DESCRIPTION OF THE PREFERRED EMBODIMENT

Figure 2:
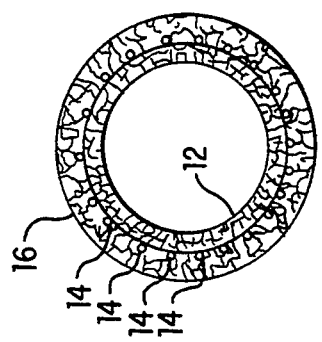
FIG. 2 is a cross sectional view of the reinforced porous pipe.

The reinforced porous pipe 10, best shown in cross-section in FIG. 2 comprises a flexible porous inner layer 12, spiral webbing reinforcement 14 wound about the porous inner layer 12, and a porous outer layer 16 covering the porous inner layer 12 and the spiral webbing reinforcement 14.

Plasticizable feed stock 18 is preferably formed by grinding by attrition (not shown) used rubber material, such as automobile tires, to form a granular elastomeric material. The granular elastomeric material is preferably ground to a size sufficient to pass through a 30 to 40 mesh screen.

Figure 1:
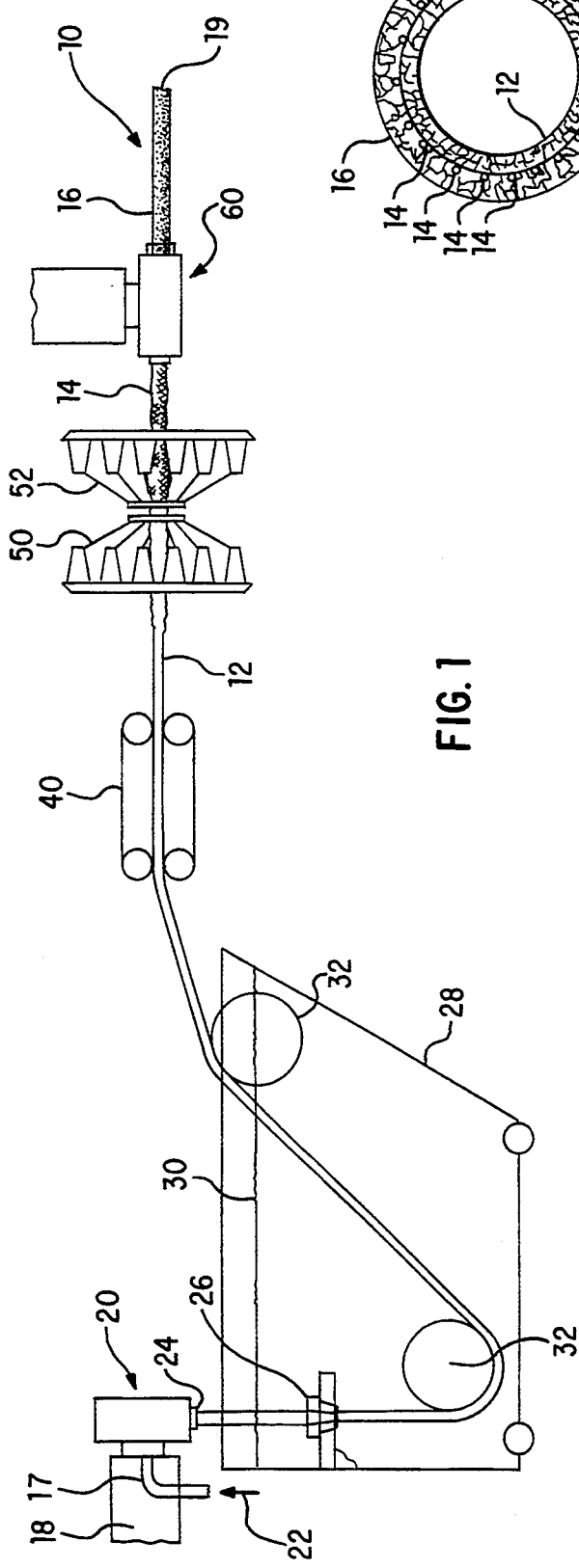
FIG. 1 is a diagram showing the preferred method of extrusion of the reinforced porous pipe.

Sixty to eighty percent of the granular elastomeric material is blended with twenty to forty percent of polyethylene polymer thermoplastic and less than one percent of an emulsifier derived from at least one of the following: abietic rosin acids, fatty acid by-products, and/or tall oil feed stocks, to form the plasticizable feed stock 18 shown in FIG. 1.

Preferably, sixty-eight to seventy-two percent of the granular elastomeric material is thoroughly mixed with twenty-eight to thirty-two percent polyethylene polymer thermoplastics and less than one percent of the emulsifier previously disclosed.

The plasticizable feed stock 18 is heated and blended until it is soft and pliable. The feed stock 18 is then fed through a first extruder means 20 to form a flexible porous inner layer 12.

A pressurized fluid 22 is preferably introduced at the core 17 of the feed stock 18 as the feedstock is being extruded by the first extrusion means 20. The fluid 22 is preferably pressurized at more than five pounds per square inch and less than 100 pounds per square inch. The pressurized fluid 22 serves to improve the substantially uniform porosity of the porous pipe 10 by escaping through the plurality of pores formed in the walls of the porous pipe 10 as the porous inner layer 12 is extruded by the first extruder means 20 and is cooled by the cooling means 30. This helps keep the plurality of pores from closing and sealing shut as the extruded porous pipe cools 10.

The distal end 19 of the reinforced porous pipe 10 may be closed, plugged or sealed to encourage the pressurized fluid 22 to exit through the plurality of pores disposed throughout the inner porous layer 12 and the outer porous layer 16 during the manufacturing process.

Preferably the first extruder means 20 comprises a cross head extruder, which provides downward extrusion 24 of the porous inner layer 12, shown in FIG. 1.

A sizing die 26 may be used to draw down the outer portion of the porous inner layer 12. Where a sizing die 26 is used, it preferably will not exceed a draw-down of more than 25 percent of the outer circumference of the porous inner layer 12. The sizing die 26, when used, is preferably adjustably positioned in relation to the first extruder means 20 to suit manufacturing preference. The sizing die 26 may be disposed within the liquid 30 used to quick-cool the extruded porous inner layer 12.

A liquid tray 28, is preferably positioned beneath the first extrusion means 20, and filled with a liquid, such as water, to form a suitable cooling means 30. The temperature of the liquid 30 in the tray 28 is preferably adjustably controlled within a temperature range of fifty to eighty degrees Fahrenheit. The liquid level in the tray 28 may be regulated to provide the desired amount of cooling.

One or more guide wheels 32 may be used to direct the porous inner layer 12 through the cooling means 30. The radius of the guide wheels 32 should be equal to or greater than the bending radius of the flexible porous inner layer 12. The porous inner layer 12 disclosed herein preferably has a minimum bend radius of six inches, although a larger or smaller bend radius may be used without departing from the scope of the disclosure and claims. The porous inner layer 12 is preferably pulled through the cooling means 30 by a suitable pulling means 40, such as a caterpuller. Other pulling means 40 known in the art may also be used.

The pulling means 40 feeds the porous inner layer 12 through at least one spiral webbing means 50, which forms an open mesh, spiral web 14 of yarn, cord, string about the porous inner layer 12 in a manner to reinforce and strengthen the porous inner layer 12. The pulling means 40 preferably advances the porous inner layer 10 at a rate of 20 to 40 linear feet per minute.

Preferably, more than one spiral webbing means 50 is used, to enable continuous operation, by alternating from one spiral webbing means 50 to another, as needed, to continuously supply webbing material 14 to the spiral webbing means 50, as the porous inner layer 12 is continuously extruded.

Any conventional webbing 14 material may be used, such as yarn, cord, string or the like, and the webbing material 14 may be of either organic or inorganic origin. The webbing material 14 is selected to provide sufficient strength to enable the reinforced porous pipe 10 to exhibit a minimum bursting pressure of at least 200 pounds per square inch.

The porous inner layer 12 with the reinforcing spiral wound webbing material 14 thereon, is then fed into a second extrusion means 60. The second extrusion means 60 is preferably fed the same plasticizable feed stock used with the first extrusion means 20.

The second extrusion means 60 preferably feeds a cross-head extruder to form a porous outer layer 16 upon the porous inner layer 12 and the spiral webbing 14 previously disposed thereon.

A second sizing die 26 (not shown) may be used to draw down the porous outer layer 16 of the flexible porous pipe 10 which is extruded from the second extrusion means 60. Where a second sizing die 26 is used, it preferably will not exceed a draw-down of more than twenty-five percent of the outer circumference of the porous outer layer 16. The second sizing die 26, when used, is preferably adjustably positioned in relation to the second extruder means 60 to suit manufacturing preference.

The reinforced porous pipe 10 may be fed into a second quick cooling means 28 (not shown) similar to the first quick cooling means 28 shown in FIG. 1, or may be cooled at room temperatures, and cut to length and coiled to suit manufacturing preference. Where a second quick cooling means 28 is used, the second sizing die 26 may be disposed within the cooling fluid 30.

The reinforced porous pipe 10 made by the method herein disclosed, exhibits a preferred substantially uniform leak rate of one-half to one gallon per hour per linear foot of reinforced porous pipe 10, at an internal pressure of twenty-five to forty-five pounds per square inch. The flexible porous pipe 10 is preferably sized to have an outer diameter of substantially one inch, and an inner diameter of substantially one-half inch. Other porous pipe 10 sizes may be manufactured to suit manufacturing preference, and the specific performance characteristics desired.

Figure 3:
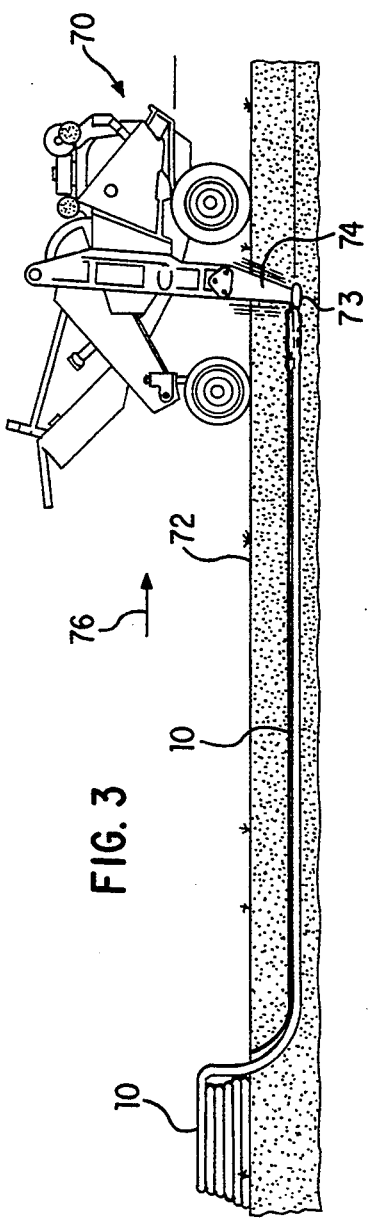
FIG. 3 is an elevation view of reinforced porous pipe being installed in the ground using vibra-plow technology.

FIG. 3 shows a vehicle 70 installing reinforced porous pipe 10 beneath the ground surface 72 using vibraplow technology. One end of the reinforced porous pipe 10 is secured to the end 73 of a blade 74. The reinforced porous pipe 10 is coiled at the start of insertion of the reinforced porous pipe 10 into the ground 72. As the vehicle 70 advances away from the starting point in the direction of arrow 76, the reinforced porous pipe 10 is pulled into the ground and through the cavity formed by the end of the blade 73.

Given a minimum bursting pressure of 200 pounds per square inch, several hundred feet of reinforced porous pipe 10 may be installed in most planting soils using the vibra-plow technology disclosed herein, which is more than sufficient for most applications. The vibra-plow technology, greatly reduces the installed cost of the reinforced porous pipe 10 disclosed herein.

Where the porous pipe 10 is intended for use above ground, an ultra-violet inhibiter is preferably used to resist degradation of the porous pipe 10 from prolonged exposure to sunlight. Commercially available ultra-violet inhibitors adaptable to the materials used in the manufacture of porous pipe 10 are known to those skilled in this art.

A coloring agent may also be selected to color the porous pipe with a light color which tends to reflect the heat of the sun rather than absorb the heat of the sun. This serves to lower the internal temperature of the pressurized fluid within the porous pipe 10. Commercially available coloring agents adaptable to the materials used in the manufacture of porous pipe are known to those skilled in this art.

One combination coloring agent and ultra-violet inhibiter that is commercially available is an inorganic oxide sold by Du Pont Chemicals under corporate number DU000348, as "TI-PURE" Titanium Dioxide pigment, no. 2816CR. Other commercially available ultra-violet inhibitors and coloring agents may also be used, without departing from the scope of this disclosure and claims.

Thus, while the reinforced porous pipe has been fully described and disclosed, numerous modifications will become apparent to one of ordinary skill in this art, and such adaptations are intended to fall within the scope of this disclosure, and the following claims.

What is claimed is:

1. A method for continuous manufacture of a flexible, reinforced porous pipe having a plurality of pores disbursed throughout the porous pipe, comprising:
   a) a heating and blending means, for heating and blending a granular elastomeric material with a polyethylene polymer thermoplastic and an emulsifier to form a plasticizable feed stock;
   b) a first extruding means for extruding the plasticizable feed stock into a porous inner layer;
   d) a quick cooling means, for quickly cooling the porous inner layer;
   e) a pulling means for pulling the flexible porous layer through the quick cooling means;
   e) at least one spiral winding means, for spiral winding a continuous open mesh webbing about the porous inner layer; and
   f) a second extrusion means, for extruding a porous outer layer about the porous inner layer and the open mesh webbing to form the flexible, reinforced porous pipe.

2. The method of claim 1, wherein the spiral winding means comprises two spiral winding means for spirally winding an open mesh webbing about the porous inner layer, the two spiral winding means being alternately used to provide continuous spiral windings about the porous inner layer, prior to passing the porous inner layer through the second extruding means.

3. The method of claim 1, wherein the first extruding means comprises a cross-head extruder positioned to extrude the inner layer of porous pipe downwardly into the cooling means.

4. The method of claim 1, wherein a sizing die, having a maximum draw-down of twenty-five percent, is adjustably positioned about the porous inner layer in proximity to the first extrusion means.

5. The method of claim 1, wherein a pressurized fluid is forced into the feed stock at its core at a pressure greater than five pounds per square inch and less than 100 pounds per square inch as the feed stock passes through the first extruding means, forcing the pressurized fluid through a plurality of pores in the porous inner layer as it passes through the cooling means to improve the substantially uniform porosity characteristics of the reinforced porous pipe.

6. The method of claim 1, wherein the quick cooling means is an open liquid tray having a selected liquid temperature, selected from a range of 50 to 80 degrees Fahrenheit.

7. The method of claim 1, wherein the porous pipe is extruded at a rate of 20 to 40 linear feet per minute.

8. The method of claim 1, wherein the porous pipe exhibits a minimum bursting pressure of at least 200 pounds per square inch.

9. The method of claim 1, wherein the porous pipe exhibits a substantially uniform leak rate of one-half to one gallon per hour per linear foot at a working pressure of twenty-five to forty-five pounds per square inch.

10. The method of claim 1, wherein the flexible porous pipe exhibits an outer diameter of substantially one inch, and an inner diameter of substantially one-half inch.

11. The method of claim 1, wherein used automobile tires are ground by attrition, and sized to pass through a 30 to 40 mesh screen, to form more than half of the granular elastomeric material used to extrude the porous pipe.

12. The method of claim 1, wherein sixty to eighty percent by volume of the granular elastomeric material is blended with twenty to forty percent by volume of a polyethylene polymer thermoplastic material, and less than one percent by volume of an emulsifier to form the plasticizable feed stock.

13. The method of claim 1, wherein the heating and blending means, for heating and blending a granular elastomeric material with a polyethylene polymer thermoplastic and an emulsifier to form a plastisizable feed stock, comprises adding an ultra-violet inhibiter to the plasticized feed stock.

14. The method of claim 1, wherein an ultra-violet inhibiter is added to the plasticized feed stock.

15. The method of claim 1, wherein a coloring agent is added to the plasticized feed stock, the coloring agent selected to reflect sunlight.

16. A method for extruding a flexible, porous pipe, comprising:
   a) blending 68 to 72 percent of a granular elastomeric material with 28 to 32 percent polyethylene polymer thermoplastic and less than one percent of an emulsifier derived from at least one abietic resin acids, fatty acid by-products and tall oil feed stocks to form a plasticizable feed stock;
   b) heating and feeding the plasticizable feed stock through a first extruder to form a continuously extruded porous inner layer;
   c) quick cooling the porous inner layer by pulling the porous inner layer through a liquid tray;
   d) reinforcing the porous inner layer with a spiral webbing reinforcement; and e) passing the porous inner layer and the spiral webbing reinforcement through a second extruder, to from a porous outer layer over the porous inner layer and the spiral webbing reinforcement to form the flexible, reinforced porous pipe.

17. The method of claim 16, wherein the heating and feeding the plasticizable feed stock through a first extruder to form a continuously extruded porous inner layer, includes continuously forcing a pressurized fluid greater than five pounds per square inch and less than 100 pounds per square inch into the core of the feed stock as it is being extruded through the first extruding means, and forcing the pressurized fluid through the porous walls of the porous inner layer to improve the porosity therethrough.

18. The method of claim 16, wherein the reinforced porous pipe is extruded at a rate of twenty to forty linear feet per minute.

19. The method of claim 16, wherein the reinforced porous pipe exhibits a minimum bursting pressure of at least 200 pounds per square inch.

20. The method of claim 16, wherein the porous pipe exhibits a substantially uniform leak rate of one-half to one gallon per hour per linear foot at a pressure of twenty-five to forty-five pounds per square inch.

21. The method of claim 16, wherein an ultra-violet inhibiter is added to the plasticizable feed stock, to resist degradation of the reinforced porous pipe, when exposed to sunlight.

22. The method of claim 16, wherein a coloring agent is added to the plasticized feed stock, the coloring agent selected to reflect sunlight.

23. The method of claim 16, wherein the reinforced porous pipe exhibits an outer diameter of substantially one inch, and an inner diameter of substantially one-half inch.

24. A method for manufacture of a flexible, reinforced porous pipe, comprising:
   a) forcing a heated, plasticizable feed stock through a first extruder means to form a flexible, porous inner layer;
   b) quick cooling the porous inner layer;
   c) winding a reinforcing web about the porous inner layer;
   d) passing the porous inner layer and the reinforcing web through a second extruder means to form a flexible, porous outer layer thereon; and
   e) forcing a pressurized fluid into the plasticized feed stock as the feed stock is passing through the first extruder means at a pressure greater than five pounds per square inch and less than 100 pounds per square inch.

* * * * *